US012663368B2

(12) United States Patent
Kakuta et al.

(10) Patent No.: US 12,663,368 B2
(45) Date of Patent: Jun. 23, 2026

(54) WATER VAPOR DISTRIBUTION MEASUREMENT APPARATUS

(71) Applicant: TOKYO METROPOLITAN PUBLIC UNIVERSITY CORPORATION, Tokyo (JP)

(72) Inventors: Naoto Kakuta, Tokyo (JP); Rintaro Takagi, Tokyo (JP); Shintaro Ozawa, Tokyo (JP); Takayoshi Kaneko, Tokyo (JP)

(73) Assignee: TOKYO METROPOLITAN PUBLIC UNIVERSITY CORPORATION, Tokyo (JP)

( * ) Notice: Subject to any disclaimer, the term of this patent is extended or adjusted under 35 U.S.C. 154(b) by 285 days.

(21) Appl. No.: 18/279,888

(22) PCT Filed: Mar. 1, 2022

(86) PCT No.: PCT/JP2022/008556
§ 371 (c)(1),
(2) Date: Sep. 1, 2023

(87) PCT Pub. No.: WO2022/186186
PCT Pub. Date: Sep. 9, 2022

(65) Prior Publication Data
US 2024/0151641 A1 May 9, 2024

(30) Foreign Application Priority Data
Mar. 2, 2021 (JP) ................................. 2021-032316

(51) Int. Cl.
*G01N 21/3554* (2014.01)
*G01N 21/3504* (2014.01)
(Continued)

(52) U.S. Cl.
CPC ..... *G01N 21/3554* (2013.01); *G01N 21/3504* (2013.01); *G01N 21/359* (2013.01);
(Continued)

(58) Field of Classification Search
CPC ............... G01N 21/39; G01N 21/3504; G01N 21/3554; G01N 21/359
See application file for complete search history.

(56) References Cited

U.S. PATENT DOCUMENTS 3,281,597 A * 10/1966 Greenberg ......... G01N 21/3504
250/351
5,892,229 A * 4/1999 Crozier .............. G01N 21/3504
250/343

(Continued)

FOREIGN PATENT DOCUMENTS

CN 204389393 U 6/2015
CN 106338490 A * 1/2017 ......... G01N 21/3577
(Continued)

OTHER PUBLICATIONS

Translation of CN106338490.*
(Continued)

*Primary Examiner* — Helen C Kwok
(74) *Attorney, Agent, or Firm* — HAUPTMAN HAM, LLP

(57) ABSTRACT
A water vapor distribution measurement apparatus comprises: a light source that emits near-infrared light; a near-infrared light measurement device that is located across a measurement space from the light source and that measures the near-infrared light; an optical system that expands and applies the near-infrared light emitted from the light source in the measurement space in which a cross-section of the measurement space perpendicular to a direction connecting the light source to the near-infrared light measurement
(Continued)

device has an area; and a distribution deriving means for deriving a water vapor distribution in the cross-section of the measurement space on the basis of a measurement result obtained by the near-infrared light measurement device. Water vapor in a measurement region having a prescribed size can be measured by this water vapor distribution measurement apparatus.

6 Claims, 16 Drawing Sheets
(3 of 16 Drawing Sheet(s) Filed in Color)

(51) Int. Cl.
  *G01N 21/359*          (2014.01)
  *G01N 21/39*           (2006.01)
(52) U.S. Cl.
  CPC ....... *G01N 21/39* (2013.01); *G01N 2021/354* (2013.01); *G01N 2201/0238* (2013.01); *G01N 2201/06113* (2013.01); *G01N 2201/0639* (2013.01); *G01N 2201/065* (2013.01)

(56)                References Cited

U.S. PATENT DOCUMENTS

2004/0056197 A1*  3/2004  Davidson ............. G01N 21/359
                                                         250/339.1
2008/0123712 A1*  5/2008  Zhou ..................... G01N 21/39
                                                         372/55

2009/0216463 A1*  8/2009  Xie .................... G01N 21/3554
                                                         250/343
2012/0197096 A1*  8/2012  Ridder .................. G01J 3/0291
                                                         600/314
2013/0135619 A1*  5/2013  Hirata ................ G01N 21/3504
                                                         356/409
2013/0280132 A1*  10/2013  Maskrot ................. G01N 21/05
                                                         422/83
2015/0338340 A1*  11/2015  Jiang ..................... A61B 5/082
                                                         600/532
2020/0018693 A1*  1/2020  Akagawa ........... G01N 21/3504
2022/0155224 A1*  5/2022  Matsuda ............... G01J 3/0289

FOREIGN PATENT DOCUMENTS

JP        H04060216 B2      9/1992
JP        H07072078 A       3/1995
JP        H08159964 A       6/1996
JP        2000035371 A      2/2000
JP        2015045540 A      3/2015
JP        2018036228 A      3/2018

OTHER PUBLICATIONS

Rintaro Takagi et al., Visualization of water vapor distribution in a specific space using a near-infrared tunable laser source, The Proceedings of Mechanical Engineering Congress. Japan, ISSN 2424-2667, Sep. 7, 2020, pp. J05219, 1pp.

* cited by examiner 1866 nm

FIG. 7A                                    FIG. 7B
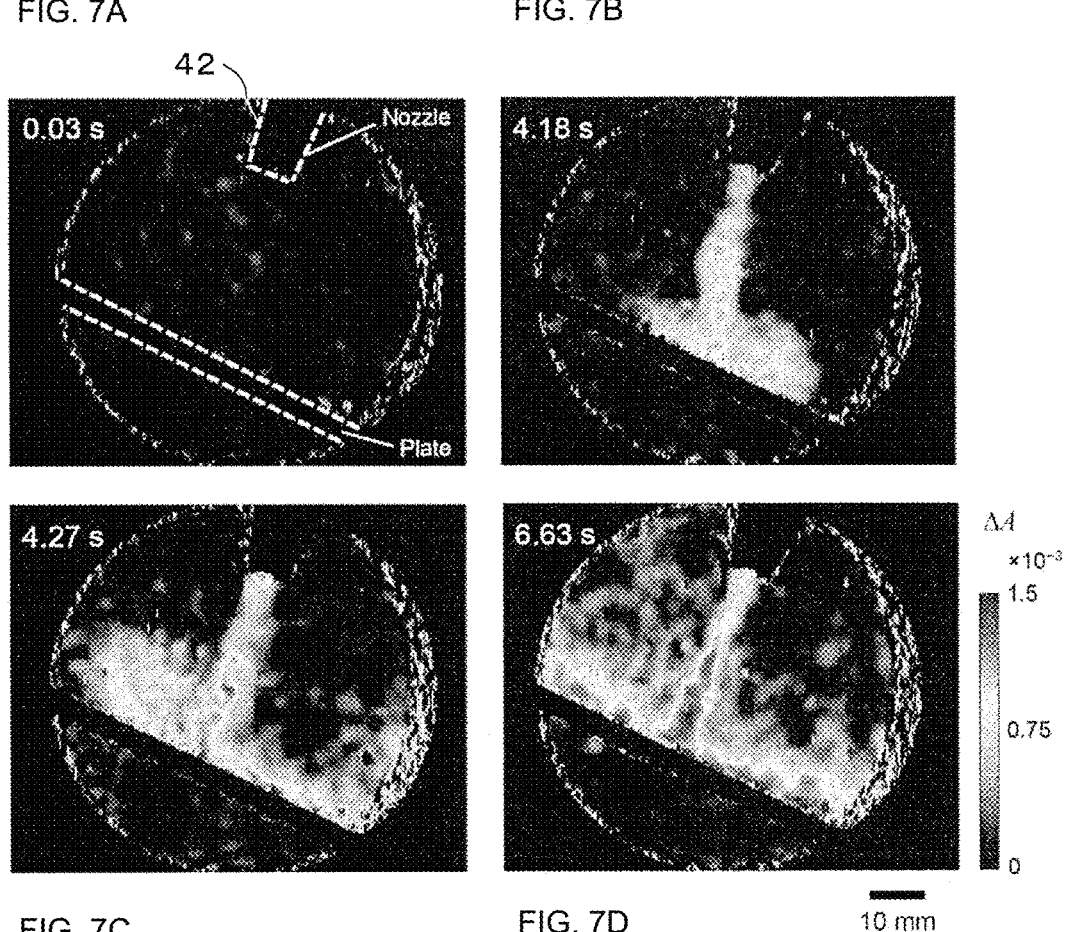
FIG. 7C                                    FIG. 7D

WATER VAPOR DISTRIBUTION MEASUREMENT APPARATUS

RELATED APPLICATIONS

The present application is a National Phase of International Application Number PCT/JP2022/008556, filed Mar. 1, 2022, which claims priority to Japanese Application Number 2021-032316, filed Mar. 2, 2021.

TECHNICAL FIELD

The present invention relates to a water vapor distribution measurement apparatus for measuring a distribution of the water vapor in a space.

BACKGROUND ART

Since water vapor which is universally present in the air affects the quality control and stable operation of precision electronic devices and food, rigorous humidity control is important. As a device for measurement of humidity, that is, measurement of water vapor concentration, devices using various principles are commercially available.

In relation to a technique for detecting water vapor, techniques described in Patent Documents 1 and 2 below are known in the art.

Patent Document 1 (Japanese Patent Laid-Open Publication No. 2000-35371) describes a technique for detecting the presence or absence of water vapor leakage by measuring heat rays from a heat generating part (31) of water vapor (3) with an infrared camera (6), when irradiating the water vapor (3) leaking from a crack part (2) of a pipe (1) with a laser light (5) having a wavelength of 1.064 μm (=1064 nm). Patent Document 1 also describes two-dimensionally generating the heat generating part (31) by performing a scan with the laser light (5).

Patent Document 2 (Japanese Patent Laid-Open Publication No. 2015-45540) describes a technique of irradiating a textile product in a dark room by spreading a visible laser light of blue to green colors having a wavelength of 400 nm to 600 nm in order to visualize associated water molecules released/absorbed into the textile product.

PRIOR ART DOCUMENT

Patent Document

Patent Document 1: Japanese Patent Laid-Open Publication No. 2000-35371 ("0010" to "0019," and FIGS. 1 and 2)

Patent Document 2: Japanese Patent Laid-Open Publication No. 2015-45540 ("0014" to "0017")

SUMMARY OF INVENTION

Problems to be Solved by Invention

The technique described in Patent Document 2 cannot measure water vapor in the air.

In addition, as techniques for measuring water vapor, there are an electrical humidity sensor and an optical moisture sensor using an infrared laser as in Patent Document 1. However, these sensors are devices for measuring the humidity at a point in the air and the moisture content in a sample gas, respectively. Therefore, it is impossible to measure water vapor distribution in a region (area) having a width to some degree.

In the prior art, when measuring the water vapor distribution in an area, it is necessary to perform a scan with laser light as described in Patent Document 1. However, in the scanning configuration, a temporal deviation in measurement results of each point (spot) occurs depending on the scanning speed. Therefore, it is not possible to measure the exact distribution of the water vapor which is diffusing and flowing.

Accordingly, in the prior art, it is not possible to obtain the spatial distribution, flow, and generation source of water vapor, which are required by rigorous humidity control in recent years.

It is a technical object of the present invention to measure water vapor in a measurement region having a predetermined width.

Means for Solving Problems

In order to solve the above technical object, according to a first aspect of the present invention, there is provided a water vapor distribution measurement apparatus including:

a light source configured to emit near-infrared light;

a near-infrared light measurement device which is located by sandwiching a measurement space with respect to the light source, and configured to measure the near-infrared light;

an optical system configured to enlarge the near-infrared light emitted from the light source and irradiate the measurement space, in which a cross-section of the measurement space perpendicular to a direction connecting the light source and the near-infrared light measurement device has an area, with the light; and a distribution deriving means configured to derive a distribution of water vapor in the cross-section of the measurement space based on measurement results obtained by the near-infrared light measurement device.

An invention of a second aspect of the present invention is the water vapor distribution measurement apparatus according to the first aspect of the present invention, including the light source configured to emit near-infrared light having a wavelength of 1800 nm to 1900 nm.

An invention of a third aspect of the present invention is the water vapor distribution measurement apparatus according to the second aspect of the present invention, including the light source configured to alternately emit near-infrared light having a center wavelength of 1866 nm and near-infrared light having a center wavelength of 1800 nm.

An invention of a fourth aspect of the present invention is the water vapor distribution measurement apparatus according to the first aspect of the present invention, including: the light source which includes a laser light source configured to emit near-infrared laser light; and the optical system which includes:

an integrating sphere configured to multiply reflect the near-infrared laser light from the light source inside to emit incoherent near-infrared light;

a concave lens configured to refract the near-infrared light from the integrating sphere according to the measurement space; and a convex lens configured to refract the near-infrared light that has passed through the concave lens to irradiate the measurement space with the light.

An invention of a fifth aspect of the present invention is the water vapor distribution measurement apparatus according to the first aspect of the present invention, including: an isolation member located within the measurement space and having an internal space isolated from outside air; and the distribution deriving means configured to derive the distribution of the water vapor in the measurement space outside the isolation member based on the measurement results of the water vapor in the internal space.

An invention of a sixth aspect of the present invention is the water vapor distribution measurement apparatus according to the fifth aspect of the present invention, wherein a noise in the measurement results of water vapor in the measurement space outside the isolation member is removed by using the measurement results of water vapor in the internal space.

Advantageous Effects

According to the invention of the first aspect of the present invention, it is possible to measure water vapor in the measurement region having a predetermined width without a time delay as compared with the case of scanning.

According to the invention of the second aspect of the present invention, it is possible to measure the distribution of the water vapor with higher accuracy than the case of using near-infrared light having a wavelength near 1400 nm.

According to the invention of the third aspect of the present invention, it is possible to measure the distribution of the water vapor from the measurement result at 1866 nm, which has a large absorbance difference, based on the measurement result at 1800 nm, which has a small absorbance difference.

According to the invention of the fourth aspect of the present invention, it is possible to irradiate the measurement space with high-intensity light and measure the distribution of the water vapor with high accuracy, compared to the case where the laser light is not used. Further, it is possible to suppress adverse effects of interference fringe compared to the case where the integrating sphere is not used.

According to the invention of the fifth aspect of the present invention, it is possible to derive the distribution of the water vapor in the measurement space based on the air inside the isolation member.

According to the invention of the sixth aspect of the present invention, it is possible to remove a noise in the measurement results of water vapor in the measurement space outside the isolation member from the measurement results of water vapor in the internal space, thereby improving the accuracy of measurement results compared to the case where the noise is not removed.

BRIEF DESCRIPTION OF DRAWINGS

The patent or application file contains at least one drawing and/or photograph executed in color. Copies of this patent or patent application publication with color drawing(s) and/or photograph(s) will be provided by the Office upon request and payment of the necessary fee.

FIGS. 3A and 3B are diagrams describing experimental results of absorbance difference spectra of moist air, wherein FIG. 3A is a graph illustrating the absorbance difference in a wavelength range of 1800 nm to 2000 nm, and FIG. 3B is an enlarged view illustrating the absorbance difference in a wavelength range of 1800 nm to 1900 nm.

FIGS. 5A to 5F are diagrams illustrating experimental results, wherein FIG. 5A is an image showing an experimental result at a wavelength of 1866 nm at the start of measurement, FIG. 5B is an image showing an experimental result at a wavelength of 1866 nm after 4.4 seconds from the start of measurement, FIG. 5C is an image showing an experimental result at a wavelength of 1866 nm after 10 seconds from the start of measurement, FIG. 5D is an image showing an experimental result at a wavelength of 1800 nm at the start of measurement, FIG. 5E is an image showing an experimental result at a wavelength of 1800 nm after 4.4 seconds from the start of measurement, and FIG. 5F is an image showing an experimental result at a wavelength of 1800 nm after 10 seconds from the start of measurement.

FIGS. 7A to 7D are diagrams describing results obtained by image processing the experimental results of Experimental Example 1, wherein FIG. 7A is an image of the absorbance difference ($\Delta A$) after 0.03 seconds from the start of measurement, FIG. 7B is an image of $\Delta A$ after 4.18 seconds from the start of measurement FIG. 7C is an image of $\Delta A$ after 4.27 seconds from the start of measurement, and FIG. 7D is an image of $\Delta A$ after 6.63 seconds from the start of measurement.

FIGS. 8A to 8D are diagrams describing experimental results of Experimental Example 2, wherein FIG. 8A is an image of $\Delta A$ after 1 second from the start of measurement, FIG. 8B is an image of $\Delta A$ after 1.96 seconds from the start of measurement, and FIG. 8C is an image of $\Delta A$ after 2.14 seconds from the start of measurement, and FIG. 8D is a graph illustrating a time change in $\Delta A$ at positions I and II in FIG. 8A.

FIGS. 9A to 9D are diagrams describing experimental results of breathing in a state of wearing a urethane mask of Experimental Example 3, wherein FIG. 9A is a photograph of an appearance, FIG. 9B is an image of $\Delta A$ after 3 seconds from the start of measurement, FIG. 9C is an image of $\Delta A$ after 5.12 seconds from the start of measurement, and FIG. 9D is an image of $\Delta A$ after 5.82 seconds from the start of measurement.

FIGS. 10A to 10D are diagrams describing experimental results of breathing in a state of wearing a non-woven fabric mask of Experimental Example 3, wherein FIG. 10A is a photograph of an appearance, FIG. 10B is an image of after 2.71 seconds from the start of measurement, FIG. 10C is an image of $\Delta A$ after 5.66 seconds from the start of measurement, and FIG. 10D is an image of $\Delta A$ after 6.54 seconds from the start of measurement.

FIGS. 11A and 11B are diagrams describing a relationship between the wavelength and the absorbance difference of experimental results of Experimental Example 4, wherein FIG. 11A is a graph of a wavelength band at 1330 nm to 1440 nm, and FIG. B is a graph of a wavelength band at 1800 nm to 1950 nm.

FIGS. 13A and 13B are diagrams describing experimental results of Experimental Example 6, wherein FIG. 13A is diagrams describing a positional relationship between a nozzle and an electronic humidity sensor, and FIG. 13B is a graph illustrating a relationship between the water vapor concentration and the lapse of time.

FIGS. 15A to 15D are diagrams describing experimental results of Experimental Example 7, wherein FIG. 15A is an image of ΔA after 0.03 seconds from the start of measurement, FIG. 15B is an image of ΔA after 4.32 seconds from the start of measurement, FIG. 15C is an image of ΔA after 4.70 seconds from the start of measurement, and FIG. 15D is an image of ΔA after 9.50 seconds from the start of measurement.

FIGS. 16A to 16C are diagrams describing experimental results of Experimental Example 8, wherein FIG. 16A is a graph illustrating relationships between frequencies and coherences for each ratio of measurement results at each position in the measurement space and the measurement results inside a thin-wall pipe, FIG. 16B is a graph illustrating measurement results of the absorbance difference over time, and FIG. 16C is a graph after performing a correction on fluctuations from the results of FIG. 16B.

MODE FOR CARRYING OUT INVENTION

Hereinafter, examples that are specific examples of the embodiment of the present invention will be described with reference to the drawings, but the present invention is not limited to the following examples.

In the following description using the drawings, members other than members necessary for the description will be appropriately not illustrated to facilitate the understanding.

Example 1

Figure 1:
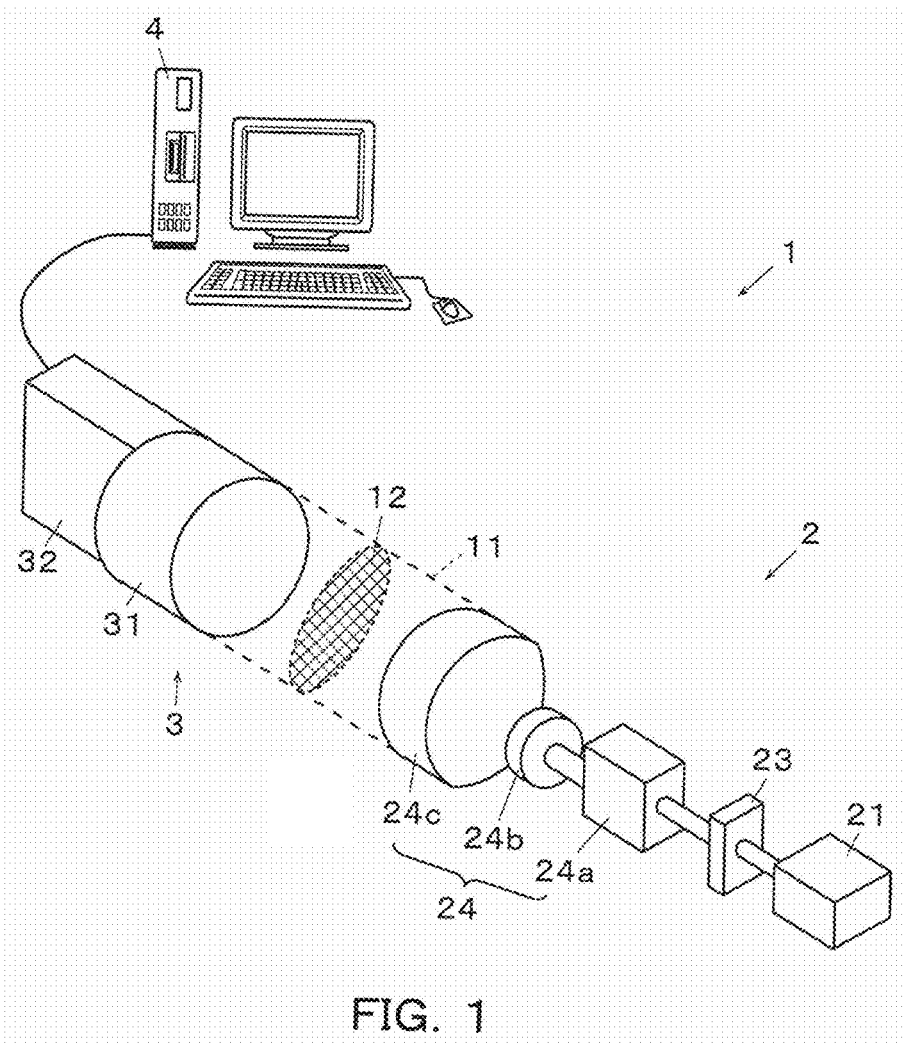
FIG. 1 is an entire view describing a water vapor distribution measurement apparatus of Example 1 of the present invention.

FIG. 1 is an entire view describing a water vapor distribution measurement apparatus of Example 1 of the present invention.

In FIG. 1, a water vapor distribution measurement apparatus 1 of Example 1 of the present invention includes an output part 2 that emits near-infrared light for measurement, an input part 3 that receives the near-infrared light, and a personal computer 4 as an example of an information processing device which performs information processing based on the results of the input part 3.

Further, in the specification and claims of the present application, the term "near-infrared" is used to mean a wavelength range of 1200 nm to 2400 nm.

The input part 3 is located spaced apart from the output part 2, and a measurement space 11 is present between the output part 2 and the input part 3. In the measurement space 11, a cross-section (a measurement cross-section 12) perpendicular to an advancing direction (optical axis) of the near-infrared light emitted from the output part 2 has a predetermined area.

(Description of Output Part 2)

Figure 2:
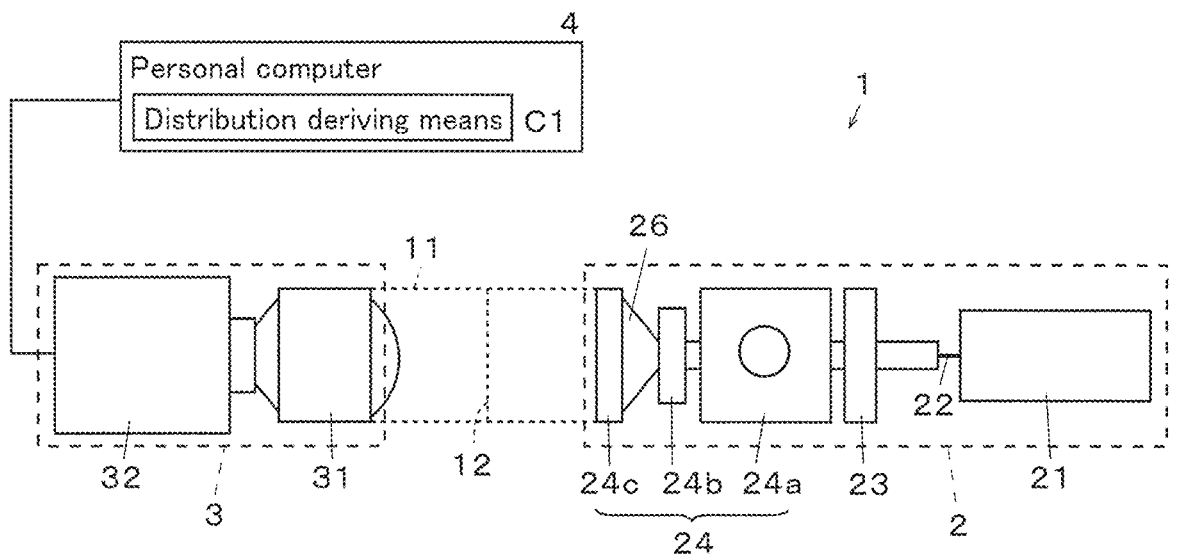
FIG. 2 is a schematic view describing the water vapor distribution measurement apparatus of Example 1.

FIG. 2 is a schematic view describing the water vapor distribution measurement apparatus of Example 1.

In FIG. 2, the output part 2 has a near-infrared laser 21 as an example of a light source that emits near-infrared light. The near-infrared laser 21 emits laser light 22 in a near-infrared region. The near-infrared laser 21 of Example 1 includes a tunable laser (wavelength tunable laser) which can vary the wavelength of laser light. In Example 1, the wavelength can be changed within a range of 1650 nm to 2000 nm in the near-infrared region. As a result of the research by the present inventors, it can be found that the near-infrared laser 21 of Example 1 alternately emits laser light 22 with a wavelength of 1866 nm, which was confirmed that the absorption (absorbance difference) of water vapor is maximum, and a wavelength of 1800 nm, which has a minimum absorption of water vapor. In addition, there is a wide range in the wavelength of light emitted by the laser, and for example, even when the wavelength is set to be "1866 nm," the light having a peak at 1866 nm and a width such as a full width at half maximum of 1861 to 1871 nm is actually emitted. Therefore, in the specification and claims of the present application, even if it is actually "laser light having a width about a center wavelength of 1866 nm," it may be simply described as "laser light having a wavelength of 1866 nm."

The laser light 22 emitted from the near-infrared laser 21 is attenuated to a predetermined light amount by a neutral density filter 23 as an example of a light amount adjustment member.

The laser light 22 that has passed through the neutral density filter 23 is input to an optical system 24. The optical system 24 of Example 1 has an integrating sphere 24a, a concave lens 24b, and a convex lens 24c.

The integrating sphere 24a has a hollow spherical configuration, and includes a reflection surface formed on an inner surface thereof to reflect light. The integrating sphere 24a multiple-reflects the laser light 22 introduced inside on the inner surface, and emits the laser light 22 by reducing coherence thereof or as incoherence.

The concave lens 24b refracts the near-infrared light 26 from the integrating sphere 24a and enlarges it according to the measurement space 11.

The convex lens 24c refracts the near-infrared light 26 that has passed through the concave lens 24b, and makes light parallel toward the measurement space 11.

The output part 2 of Example 1 is composed of members denoted by reference numerals 21 to 24 and the like.

(Description of Input Part 3)

The input part 3 has a telecentric lens 31 as an example of an optical member, and a near-infrared camera 32 as an example of a near-infrared light measurement device.

The light that has passed through the measurement space 11 is incident on the telecentric lens 31, and is collected according to an area of an imaging surface of the near-infrared camera 32.

The near-infrared camera 32 measures near-infrared light.

(Description of Personal Computer 4)

A personal computer 4 of Example 1 is composed of a computer device which has an input/output (I/O) interface for inputting/outputting signals from/to an outside and adjusting input/output signal levels, a read only memory (ROM) in which a program for performing required processing, data, and the like are stored, a random access memory (RAM) for temporarily storing required data and programs, a central processing unit (CPU) which performs processing according to a boot program stored in the ROM, etc., and a clock oscillator, etc., and may realize various functions by executing the programs stored in the ROM and RAM, etc.

The personal computer 4 is stored with a basic software for controlling basic operations, a so-called operating system (OS), a water vapor distribution measurement program AP1 as an example of an application program, and other software (not shown).

Information on the measurement results is input to the personal computer 4 from the near-infrared camera 32.

A distribution deriving means C1 of the water vapor distribution measurement program AP1 derives a distribution of the water vapor in the measurement cross-section 12 of the measurement space 11 based on the measurement results in the near-infrared camera 32. The distribution deriving means C1 of Example 1 derives the distribution of the water vapor in the measurement cross-section 12 based on a absorbance difference of the near-infrared light in the water vapor of the measurement space 11, and displays it two-dimensionally. In Example 1, the measurement result at a wavelength of 1800 nm, where the absorbance difference is minimum, that is, light is minimally transmitted without being absorbed by water vapor even in the presence of the water vapor, and the measurement result at a wavelength of 1866 nm, where the absorbance difference is maximum, that is, light is easily absorbed in the presence of water vapor are compared with each other, thus to derive a change in the absorbance resulted from the water vapor. To be specific, removal of noise and calibration are performed from the measurement result at the wavelength of 1866 nm using the measurement result at the wavelength of 1800 nm. Then, a sum of the water vapor amounts on optical paths for each pixel (minimum measurement unit) of the measurement cross-section 12 is derived, thus to derive the distribution of the water vapor. That is, an integral image of the water vapor distribution in the measurement cross-section 12 in the optical path direction is derived. At this time, when an amount of the absorbed light is large, it is derived as an image with a high concentration of the water vapor, and when the amount of the absorbed light is small, derived as an image with a low concentration of the water vapor.

Operation of Example 1

In the water vapor distribution measurement apparatus 1 of Example 1 having the above-described configuration, the light from the near-infrared laser 21 is enlarged by the optical system 24, and the measurement space 11 is irradiated with the light. Then, the near-infrared light 26 that has passed through the measurement space 11 is collected by the telecentric lens 31 and measured by the near-infrared camera 32. Therefore, it is possible to measure the water vapor in the measurement region (measurement cross-section 12), in which a cross-section has an area, without a time lag (temporal delay) as compared to the conventional configuration of performing a scan with the laser light. Further, when performing scanning, if the area is large, it takes a long time to measure the entire surface, but in Example 1, it is possible with a single measurement, and the time may be shortened.

Further, in Example 1, the laser light source is used as a light source, and the intensity of the light is higher than that of illumination light such as a lamp. If the light intensity is low, the signal of the absorption observation will be weakened, and the measurement of water vapor distribution may be difficult. On the other hand, in Example 1 using the near-infrared laser 21, it is possible to observe the water vapor distribution over a wider area than the case where the light intensity is low.

Furthermore, in general, if the laser light 22 is enlarged by a lens without using the integrating sphere 24a, there is a problem entailed in the adverse effect of interference fringes. On the other hand, in the configuration of Example 1 using the integrating sphere 24a, the adverse effect of the interference fringes is suppressed, and it is possible to accurately observe the distribution of the water vapor.

Further, in Example 1, the near-infrared light is used. In a mid-infrared region, there is an absorption band of water vapor at wavelengths of 2500 nm to 2800 nm, and the absorption is stronger than that in the near-infrared region, such that high-sensitivity measurement of water vapor is theoretically possible. However, when using light in the mid-infrared region and the far-infrared region, there are problems that it is necessary to use components corresponding to each wavelength region as optical components, and costs are increased. On the other hand, when using the near-infrared light, optical components for visible light, which are widely distributed with low costs, can be often used as they are (particularly, at a wavelength of 2000 nm or less). Therefore, compared to the case of using light having a wavelength longer than mid-infrared, in Example 1, it is possible to suppress an increase in the costs.

Furthermore, in Example 1, light having wavelengths of 1800 nm and 1866 nm (hereinafter sometimes referred to as "near 1800 nm") is used. It is also academically known that water vapor also has a strong absorption band near 1400 nm, and academically, researches for measuring water vapor using a laser light having a wavelength near 1400 nm are found here and there. However, it was confirmed that the intensity of absorption is stronger near 1800 nm than near 1400 nm. If the absorption is weak, it may be difficult to observe water vapor accurately, but in Example 1 using light having a wavelength near 1800 nm, it is possible to observe the water vapor more accurately.

In addition, between Patent Document 1 that detects heat by heating the water vapor with a laser, or Patent Document 2 that uses visible light for visualization with the human eye, and Example 1 which is intended to detect the water vapor based on light absorption, principles and configurations for measurement are different.

(Relationship Between Absorption Spectrum and Wavelength)

The present invention is based on absorption spectroscopy properties of water vapor. For absorbance, the Lambert-Beer's law is known. This law represents that the absorbance of a sample to be measured is proportional to the concentration and thickness of the sample. When a transmitted light intensity is $I_o$, an absorbance A is represented by Equation (1) below.

$$A = \log(I_0/I) = \log(1/T) = cd\varepsilon \qquad \text{Equation (1)}$$

Here, c is the concentration, d is the sample thickness, and $\varepsilon$ is a molar extinction coefficient.

Since the absorbances are different from each other depending on the concentrations and temperatures of the samples to be measured, an absorbance difference $\Delta A$ may be calculated by defining a reference (represented by subscript r) and taking a difference as in Equation (2) below.

$$\Delta A = A - A_r = -\log(I/I_0) - \{-\log(I_r/I_o)\} = -\log(I/I_r) \qquad \text{Equation (2)}$$

$\Delta A$ spectra of moist air are shown in FIG. 3.

Figure 3A:
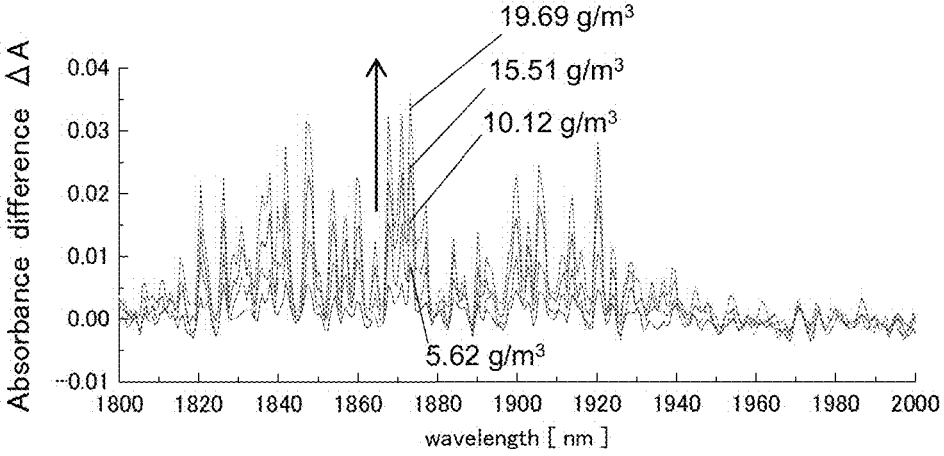
Figure 3B:
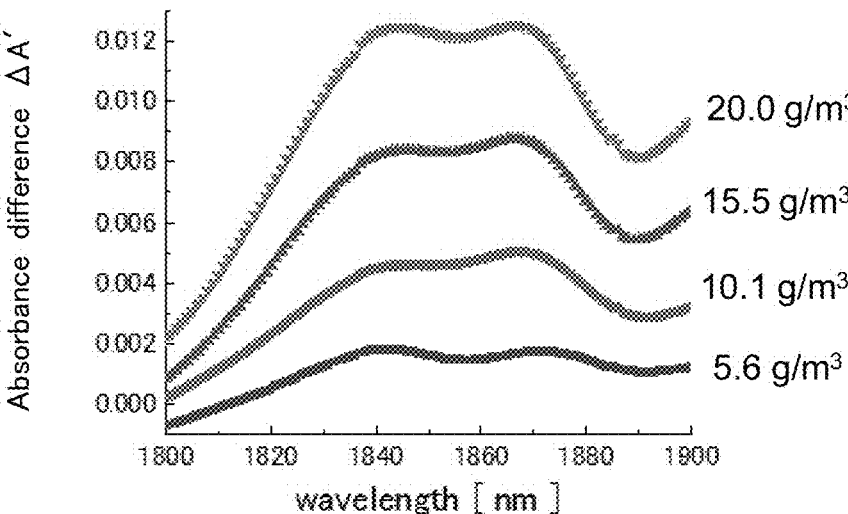

FIGS. 3A and 3B are diagrams describing experimental results of absorbance difference spectra of moist air, wherein FIG. 3A is a graph illustrating the absorbance difference in a wavelength range of 1800 nm to 2000 nm, and FIG. 3B is an enlarged view illustrating the absorbance difference in a wavelength range of 1800 nm to 1900 nm.

In this experiment, moist air was flowed in a gas cell in which quartz plates were attached to both sides of a plastic cylindrical container having a length of 168 mm and a diameter of 59 mm, then spectrum was measured by Fourier transform infrared spectroscopy (FT-IR) while recording humidity. The air temperature was 19° C. In the experiment, the humidity of the moist air was 5.62 [g/m³], 10.12 [g/m³], 15.51 [g/m³], and 19.69 [g/m³], and an experiment was performed for these cases.

As shown in FIG. 3A, an absorption peak group of water vapor are observed in a wavelength range of about 1820 to 1930 nm. In this imaging experiment, a wavelength-tunable laser, of which the spectrum of the output light has a full width at half maximum of 11 nm, was used. Thus, by approximating this spectrum by a Gaussian function and multiplying it by the FT-IR spectrum, sensitivities for each wavelength were estimated. Results thereof are shown in FIG. 3B.

In FIG. 3B, even if the humidity is any value, large absorption peaks are present relatively densely at wavelengths of 1860 to 1870 nm, such that there is no significant difference in the sensitivity. However, it can be seen that 1866 nm with maximum absorption is the most preferable here. Therefore, a wavelength of 1866 nm was selected. At the same time, 1800 nm, which has a very small $\Delta A$ for water vapor, was also selected, and visualized the water vapor by comparing the $\Delta A$ images at both wavelengths.

Figure 4:
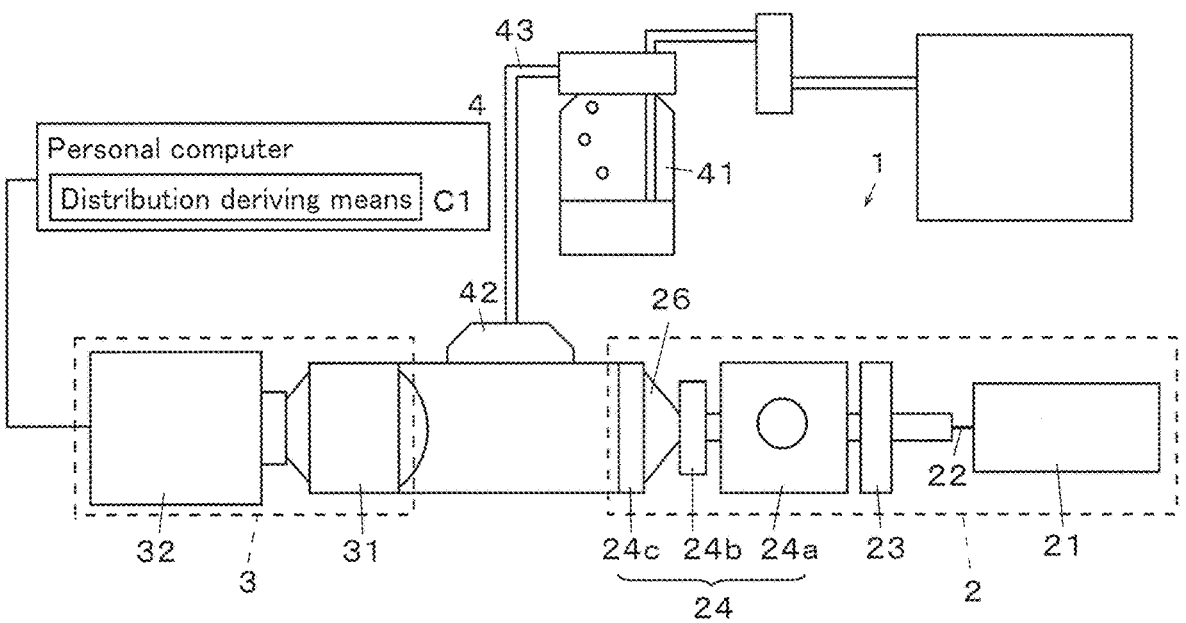
FIG. 4 is a view illustrating an experimental device.

FIG. 4 is a view illustrating an experimental device.

In FIG. 4, a wavelength tunable laser 21 (Hamamatsu Photonics) was used as the light source. The wavelength tunable laser 21 used in the experiment had a wavelength range of 1650 nm to 2000 nm, and an output of 82 mW at 1870 nm.

The light (laser light) 22 emitted from the wavelength tunable laser 21 is irregularly reflected by the integrating sphere 24a to reduce the coherence. The light emitted from the integrating sphere is enlarged by the concave lens 24b and converted into parallel light having a diameter of about 100 mm by two convex lenses 24c. The parallel light passes through the measurement space 11 and enters a near-infrared camera 32 (CV-N800, manufactured by Sumitomo Electric Industries, Ltd.) through the telecentric lens 31 (TS-TitanTL0.093X, manufactured by Edmund Optics).

In order to generate a difference in the amount of water vapor in the measurement space 11, moist air, which was generated by sending dry air into a tank 41 filled with water at 30° C., and bubbling, was discharged from a nozzle 42. The nozzle 42 is connected to the tank 41 by a tube 43 having an inner diameter of 8 mm, and an opening part of the nozzle 42 has a rectangular shape with a size of 121×3 mm. The orientation of the nozzle 42 was set so that a long axis direction of the opening part was parallel to an optical axis. The flow rate was 13 mL/min, the temperature in the open measurement space 11 was 15° C., and the relative humidity was 40%.

As an experimental procedure, lights of selected wavelengths (1866 nm and 1800 nm) are alternately emitted, and water vapor is generated after several seconds, then photographed with the near-infrared camera. Two absorbance difference images $\Delta A$1866 nm and $\Delta A$1800 nm were acquired by setting the first image as a reference image $I_r$ and setting the subsequent image as I, then applying Equation (2) thereto. Further, a new absorbance difference image $\Delta A'$ was calculated by taking a difference ($\Delta A$1866 nm to $\Delta A$1800 nm). The number of shots taken by the camera was 1000, and the frame rate was 100 Hz.

Experimental Example 1

Figures 5A, 5B, 5C:
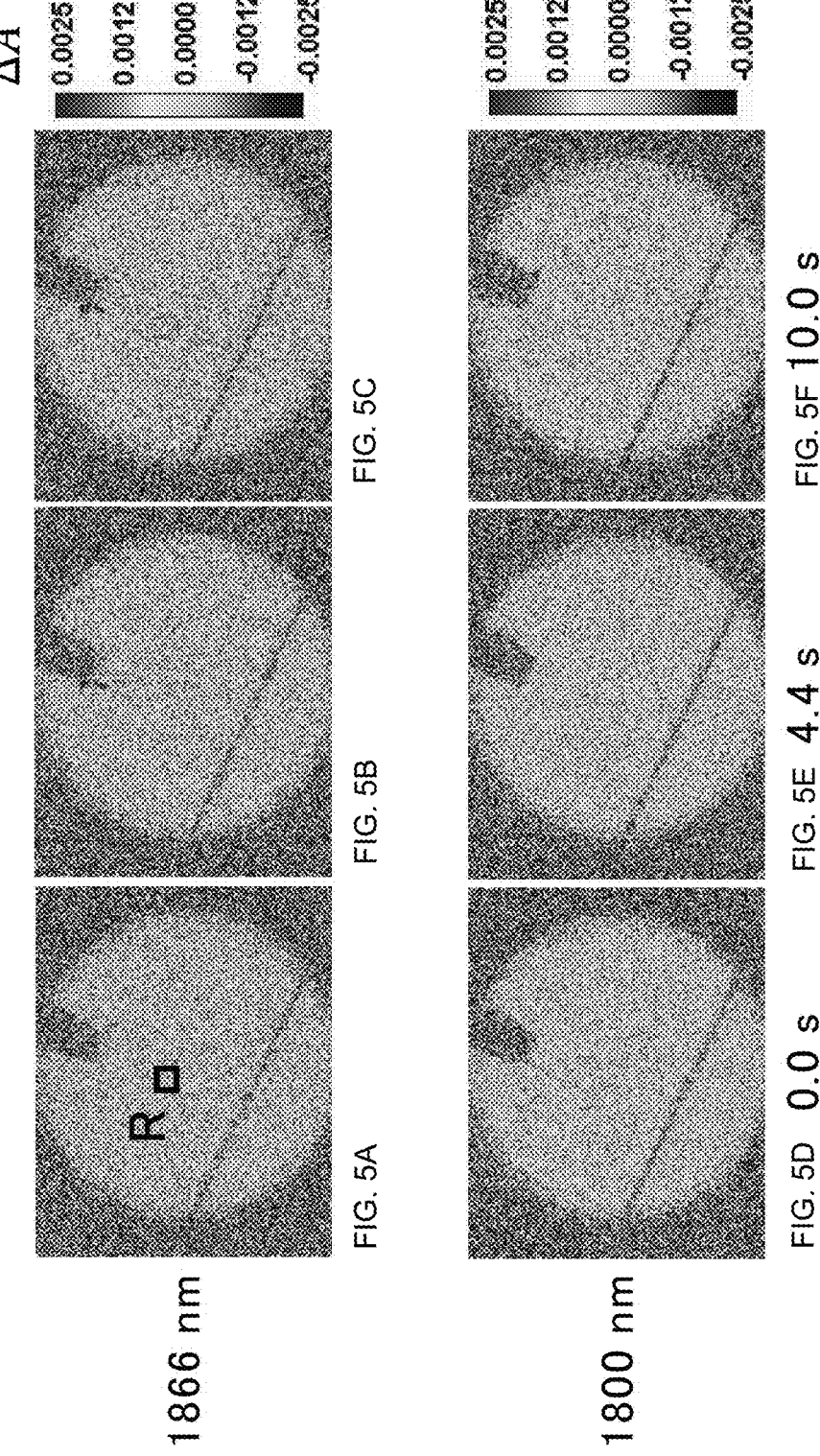

FIGS. 5A to 5F are diagrams illustrating experimental results, wherein FIG. 5A is an image showing an experimental result at a wavelength of 1866 nm at the start of measurement, FIG. 5B is an image showing an experimental result at a wavelength of 1866 nm after 4.4 seconds from the start of measurement, FIG. 5C is an image showing an experimental result at a wavelength of 1866 nm after 10 seconds from the start of measurement, FIG. 5D is an image showing an experimental result at a wavelength of 1800 nm at the start of measurement, FIG. 5E is an image showing an experimental result at a wavelength of 1800 nm after 4.4 seconds from the start of measurement, and FIG. 5F is an image showing an experimental result at a wavelength of 1800 nm after 10 seconds from the start of measurement.

FIGS. 5A to 5F show $\Delta A'$ images before (FIG. 5A) and immediately after water vapor spraying (FIG. 5B), and during spraying (FIG. 5C). When observed with light having a wavelength of 1866 nm, $\Delta A'$ in the image is uniform before water vapor spraying (FIG. 5A), but immediately after spraying (FIG. 5B), $\Delta A'$ near the nozzle 42 is increased, and an increased region was formed in a strip shape toward the bottom. $\Delta A'$ was further increased to enter a steady state as time elapses, and it was possible to read an appearance of stably spraying from the image (FIG. 5C).

On the other hand, with light having a wavelength of 1800 nm, as shown in FIGS. 5D to 5F, no water vapor could be observed.

Figure 6:
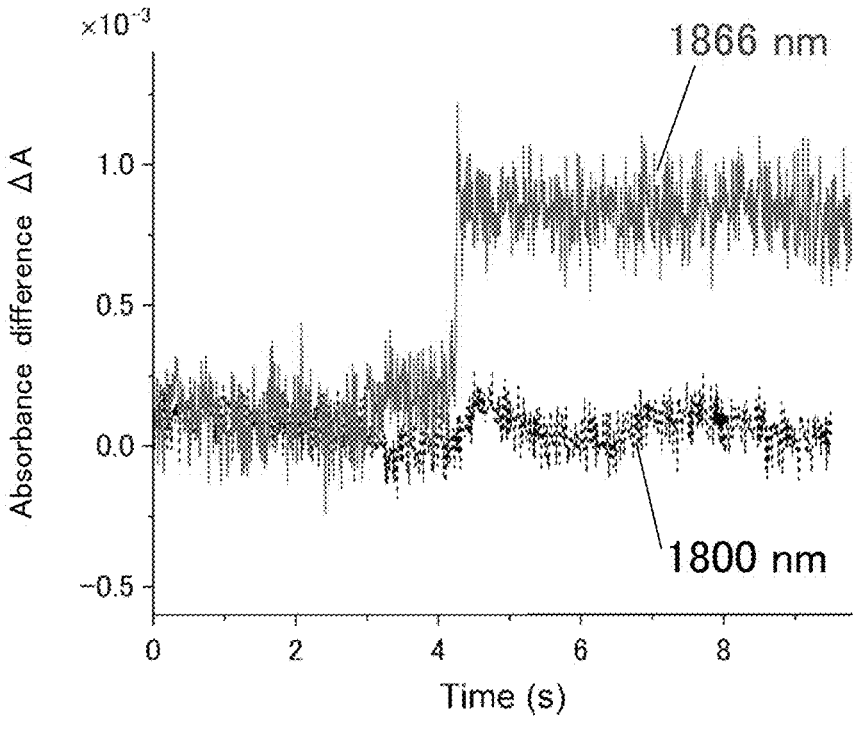
FIG. 6 is a graph illustrating experimental results of the absorbance difference in a region near a nozzle at 1866 nm and 1800 nm.

FIG. 6 is a graph illustrating experimental results of the absorbance difference in a region near a nozzle at 1866 nm and 1800 nm.

FIG. 6 is a graph plotting the absorbance difference $\Delta A$ in a region R near the nozzle 42 at respective wavelengths of 1866 nm and 1800 nm (average of the rectangular region R shown in FIG. 5A). At the wavelength of 1800 nm where light absorption of water vapor does not occur, there is no change and it is constant, but at the wavelength of 1866 nm where light absorption occurs, the absorbance difference $\Delta A$ is increased stepwise, and coincides with the spray start time. This fact indicates that the results of FIGS. 5A to 5F are derived from the absorption of water vapor. From these experimental results, the present invention has demonstrated that spray of water vapor from the nozzle 42 could be captured as an image.

FIGS. 7A to 7D are diagrams describing results obtained by image processing the experimental results of Experimental Example 1, wherein FIG. 7A is an image of $\Delta A$ after 0.03 seconds from the start of measurement, FIG. 7B is an image of $\Delta A$ after 4.18 seconds from the start of measurement FIG. 7C is an image of $\Delta A$ after 4.27 seconds from the start of measurement, and FIG. 7D is an image of $\Delta A$ after 6.63 seconds from the start of measurement.

From the experimental results of Experimental Example 1, the absorbance difference $\Delta A$ is calculated using Equation (2), and smoothed using a bilateral filter, which is a known image processing technique, thereby sharpening is possible as shown in FIGS. 7A to 7D.

Experimental Example 2

Figures 8A, 8B, 8C, 8D:
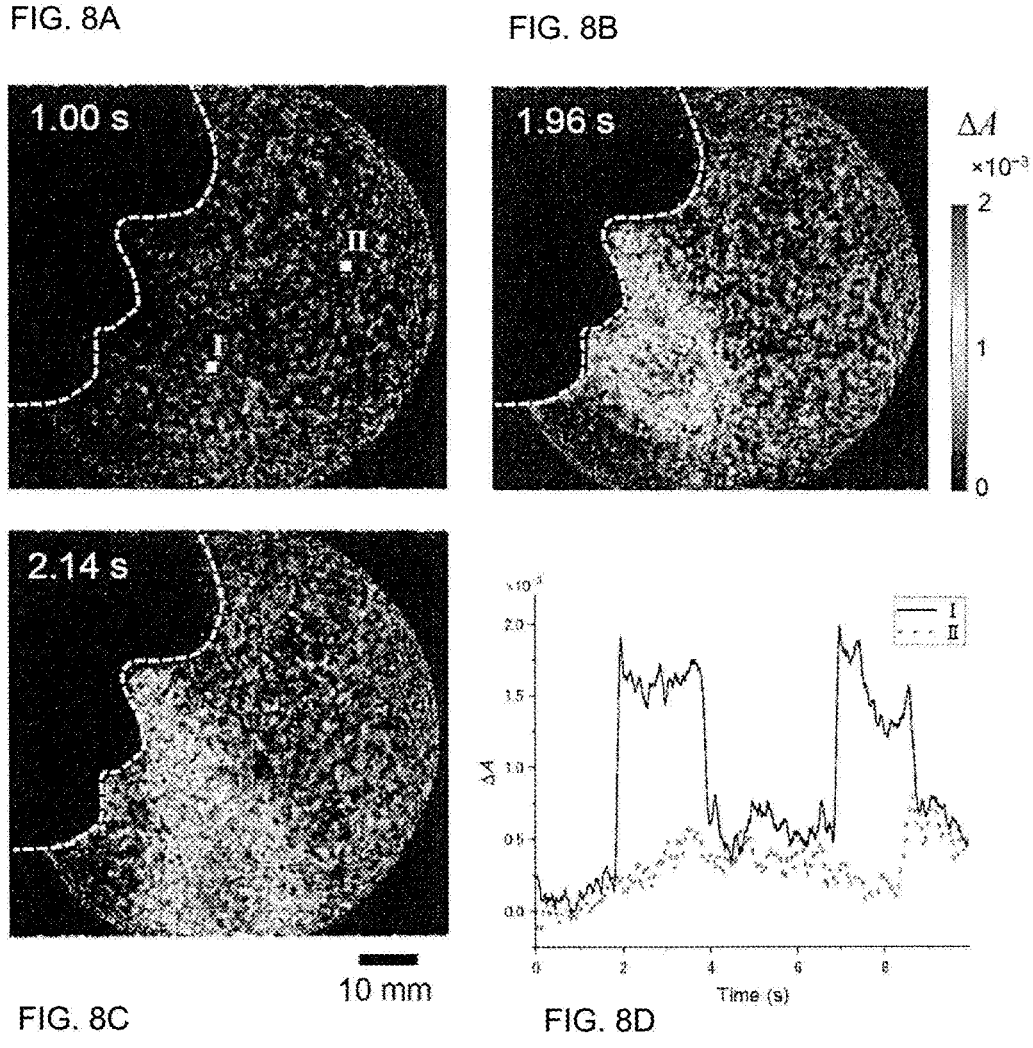

FIGS. 8A to 8D are diagrams describing experimental results of Experimental Example 2, wherein FIG. 8A is an image of $\Delta A$ after 1 second from the start of measurement, FIG. 8B is an image of $\Delta A$ after 1.96 seconds from the start of measurement, and FIG. 8C is an image of $\Delta A$ after 2.14 seconds from the start of measurement, and FIG. 8D is a graph illustrating a time change in $\Delta A$ at positions I and II in FIG. 8A.

In FIGS. 8A to 8D, in Experimental Example 2, an experiment was performed to measure changes in the amount of water vapor when a person breathes. As shown in FIGS. 8A to 8C, it was possible to visualize and observe the diffusion of the water vapor (invisible gas water molecules which are not droplets or splash water) accompanying respiration and the distribution of the water vapor during diffusion. In addition, as shown in FIG. 8D, it was also possible to derive a history of temporal changes in the absorbance difference $\Delta A$ between the position I below the nose and the position II in front of the nose, and it was also possible to observe temporal changes in the water vapor.

Experimental Example 3

Figures 9A, 9B, 9C, 9D:
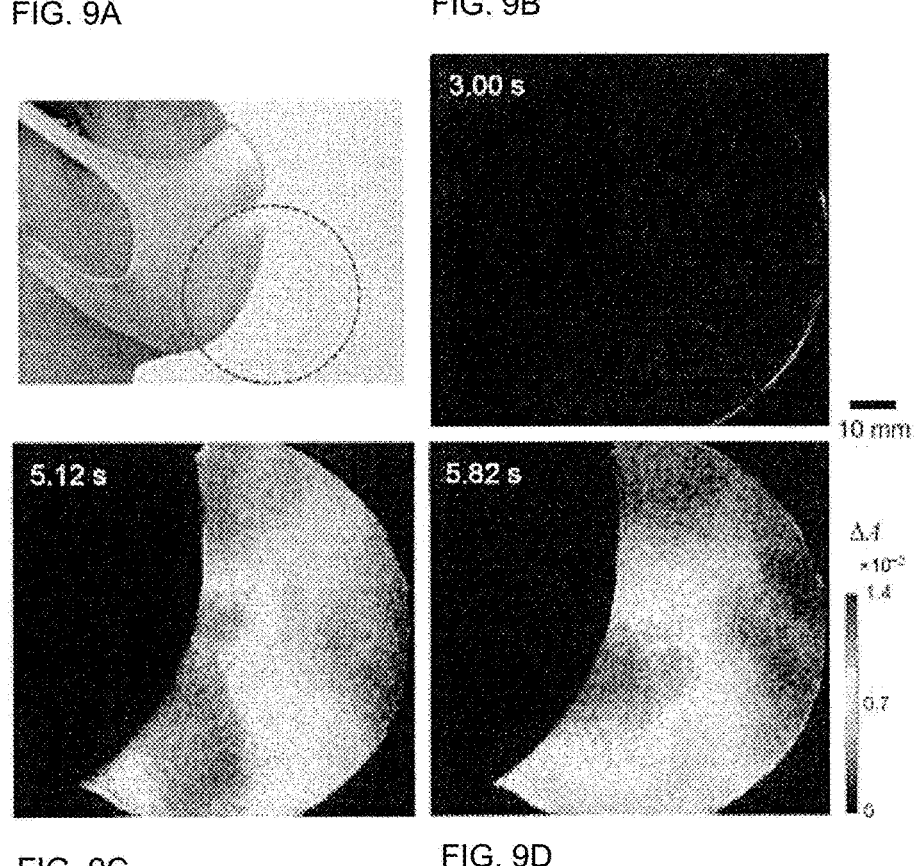

FIGS. 9A to 9D are diagrams describing experimental results of breathing in a state of wearing a urethane mask of Experimental Example 3, wherein FIG. 9A is a photograph of an appearance, FIG. 9B is an image of $\Delta A$ after 3 seconds from the start of measurement, FIG. 9C is an image of $\Delta A$ after 5.12 seconds from the start of measurement, and FIG. 9D is an image of $\Delta A$ after 5.82 seconds from the start of measurement.

Figures 10A, 10B, 10C, 10D:
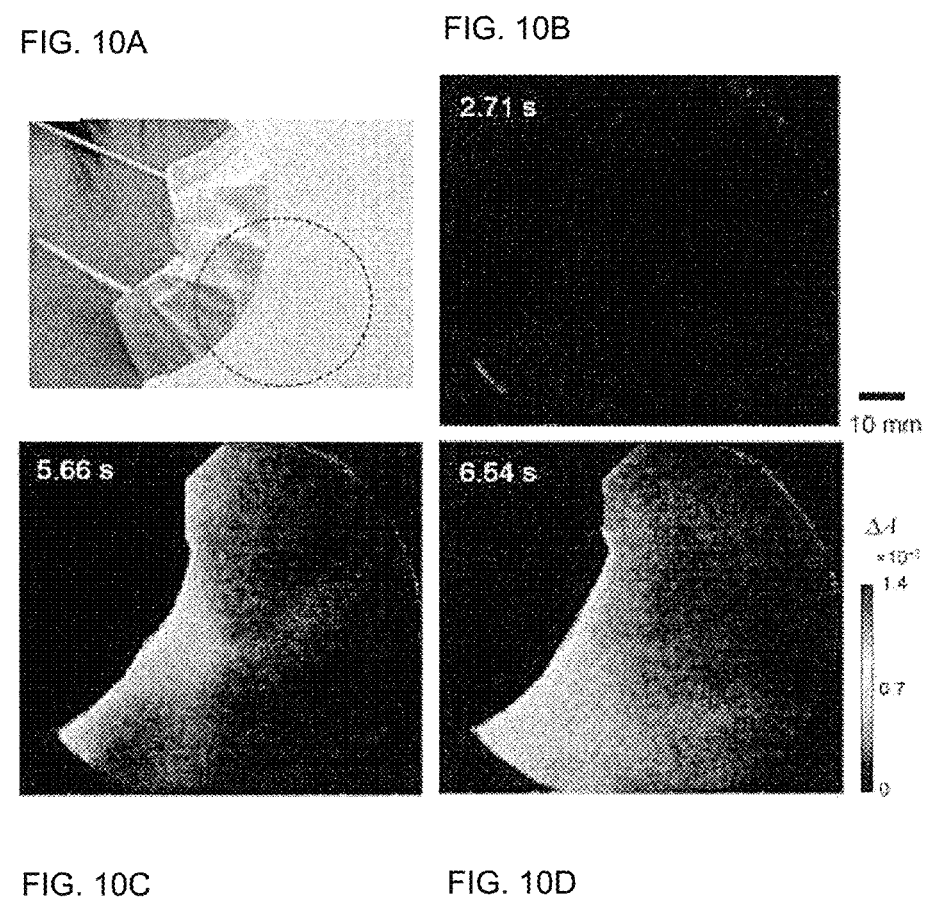

FIGS. 10A to 10D are diagrams describing experimental results of breathing in a state of wearing a non-woven fabric mask of Experimental Example 3, wherein FIG. 10A is a photograph of an appearance, FIG. 10B is an image of $\Delta A$ after 2.71 seconds from the start of measurement, FIG. 10C is an image of $\Delta A$ after 5.66 seconds from the start of measurement, and FIG. 10D is an image of $\Delta A$ after 6.54 seconds from the start of measurement.

In FIGS. 9 and 10, in Experimental Example 3, an experiment was performed to observe how exhaled air is diffused with a polyurethane mask and a non-woven fabric mask when a person breathes. As shown in FIGS. 9B to 9D, with the urethane mask, it was observed that water vapor was distributed relatively far in front of the mask in association with respiration. That is, it was confirmed that the exhaled air passed through the urethane mask with little hindrance and diffused forward. On the other hand, as shown in FIGS. 10B to 10D, in the non-woven fabric mask, even if there is respiration, it was observed that moisture is distributed relatively only near the mask to a lower portion of the mask, and the water vapor is not distributed in the front compared to the urethane mask. That is, it was confirmed that water vapor in exhaled air is more difficult to permeate through the non-woven fabric mask than through the urethane mask.

Experimental Example 4

Figure 11A:
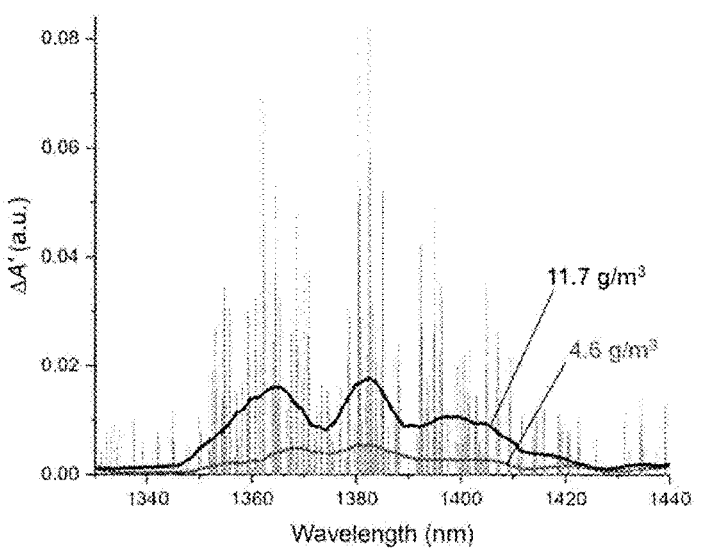

FIG. 11 is diagrams describing a relationship between the wavelength and the absorbance difference of experimental results of Experimental Example 4, wherein FIG. 11A is a graph of a wavelength band at 1330 nm to 1440 nm, and FIG. B is a graph of a wavelength band at 1800 nm to 1950 nm.

Figure 11B:
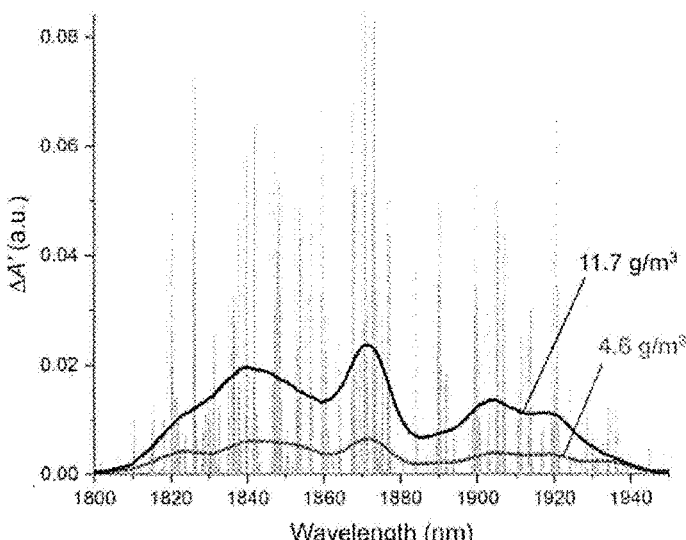

In Experimental Example 4, a value $\Delta A'$, which was corrected using a Gaussian filter with a full width at half maximum (FWHM) of 11 nm in the absorbance difference $\Delta A$ between a case where the water vapor concentration is 4.6 $g/m^3$ and a case where the water vapor concentration is 11.7 $g/m^3$, was derived. In FIGS. 11A and 11B, as a result of Experimental Example 4, peaks were observed at 1382 nm and 1872 nm, and it was confirmed that the peak height at 1872 nm was higher. Further, the results of FIGS. 11A and 11B were obtained by using a laser light source with a full width at half maximum of 11 nm, and 1872 nm is the central wavelength of the laser. As shown in FIG. 3B, even if the wavelength is not 1872 nm, if it is near 1872 nm, it is expected that sufficient measurement results will be obtained. Therefore, it is presumed that sufficient results were obtained even at 1866 nm, which is in the range of 11 nm centered at 1872 nm. In other words, as shown in FIG. 11B, there is no sharp peak at 1866 nm, and there is almost no difference in sensitivity at 1872 nm. Thereby, the wavelength to be used can be selected according to the specification of the light source such as laser. In addition, an actual light source has a wavelength width, and thus the fact is shown in FIG. 11B.

Experimental Example 5

Figure 12:
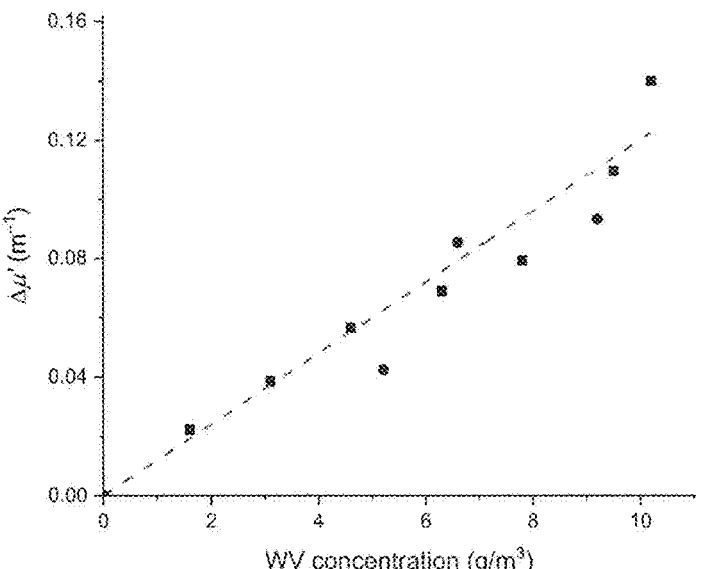
FIG. 12 is a diagram describing experimental results of Experimental Example 5, and specifically a graph illustrating a relationship between the water vapor concentration and the absorbance difference.

FIG. 12 is a diagram describing experimental results of Experimental Example 5, and specifically a graph illustrating a relationship between the water vapor concentration and the absorbance difference.

In Experimental Example 5, a plurality of moist airs with water vapor concentrations of 1.6 $g/m^3$ to 10.2 $g/m^3$ were used to derive a normalized value $\Delta\mu'$ of the absorbance difference $\Delta A'$ at a wavelength of 1872 nm. Further, it is defined that $\Delta\mu'=\Delta A'/l$, wherein l is a length of the nozzle of 168 mm (=0.168 m).

As shown in FIG. 12, it was confirmed that there is a proportional relationship between the water vapor concentration and the absorbance. Therefore, by measuring and deriving the absorbance difference, it is possible to derive the water vapor concentration.

Experimental Example 6

Figures 13A, 13B:
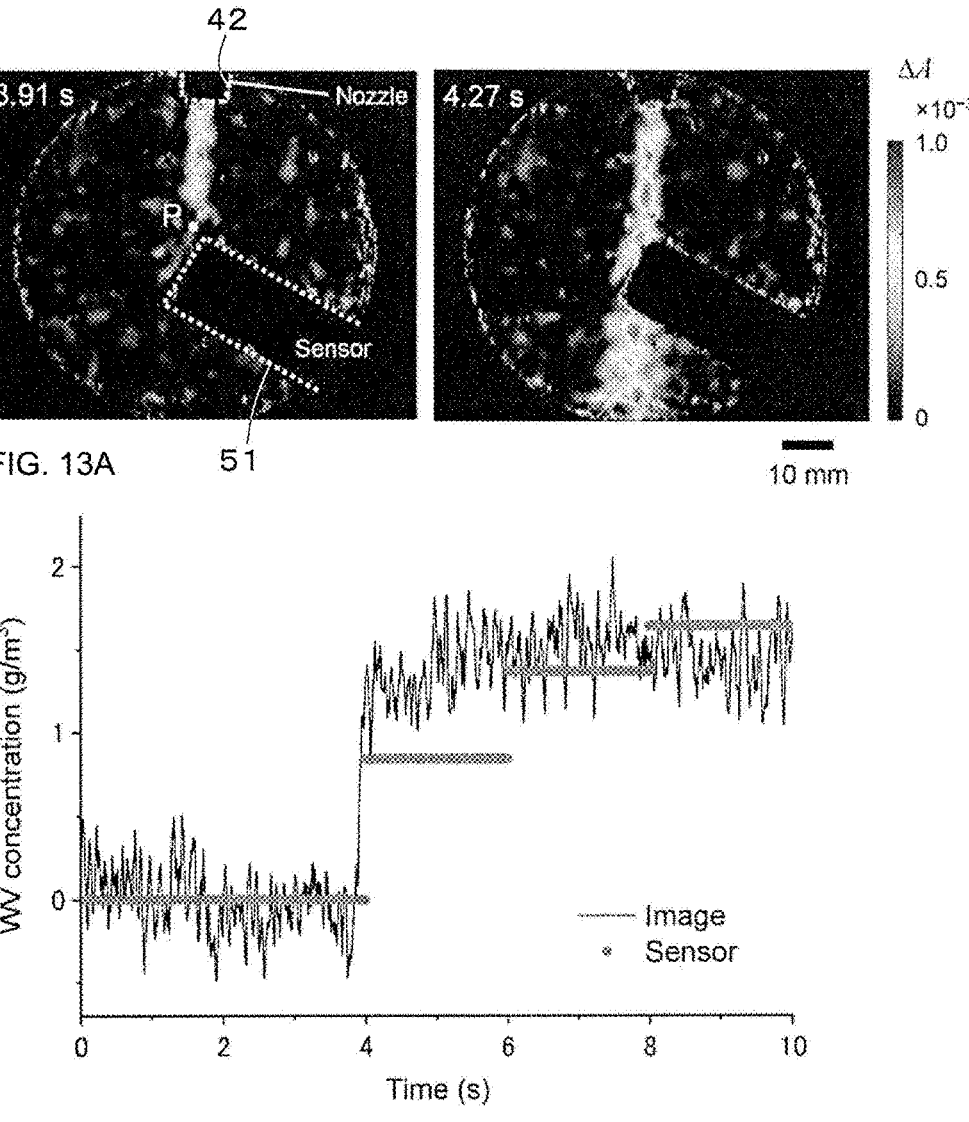

FIGS. 13A and 13B are diagrams describing experimental results of Experimental Example 6, wherein FIG. 13A is diagrams describing a positional relationship between a nozzle and an electronic humidity sensor, and FIG. 13B is a graph illustrating a relationship between the water vapor concentration and the lapse of time.

In Experimental Example 6, verification of a deviation between the water vapor concentration measured using near-infrared light and the water vapor concentration measured by an electronic humidity sensor 51 was performed.

As the electronic humidity sensor 51, HT3007SD manufactured by Sato Shoji Co., Ltd. was used. The electronic humidity sensor 51 is a device capable of directly measuring the water vapor concentration in the air. The measurement results of $\Delta A$ in Example 1 at a position R near the electronic humidity sensor 51 below the nozzle 42 are shown by solid lines in FIG. 13B, and the measurement results of the electronic humidity sensor 51 were shown by thick lines in FIG. 13B. From the results of FIG. 13B, it was confirmed that the measurement results of Example 1 using the near-infrared light and the measurement results of the electronic humidity sensor 51 were almost matched with each other, and the measurement method of Example 1 could also measure the water vapor concentration. Further, it is shown that the time response of the electronic humidity sensor 51 is slower than the time response of the measurement method of Example 1 and cannot follow a rapid change in the water vapor concentration, and in this aspect, superiority of the measurement method of Example 1 can be seen.

Modification of Example 1

Figure 14:
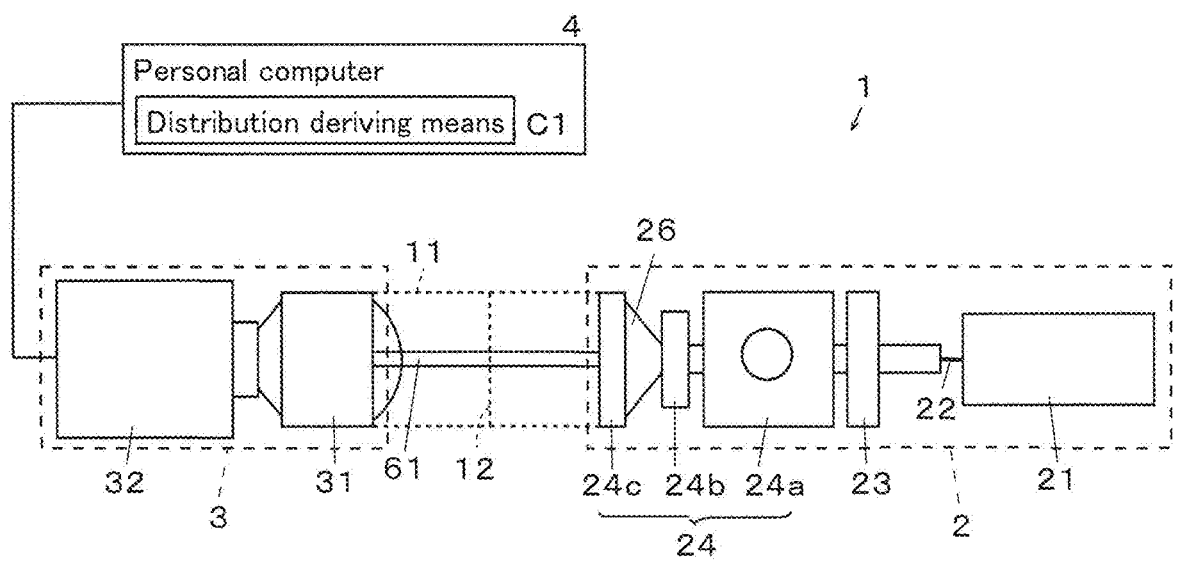
FIG. 14 is view describing a modification of Example 1, which corresponds to FIG. 2.

FIG. 14 is view describing a modification of Example 1, which corresponds to FIG. 2.

In FIG. 14, in the modification, a plastic thin-wall pipe 61 as an example of an isolation member is located in the measurement space 11. The thin-wall pipe 61 is formed in a hollow cylindrical shape, and an internal space is isolated from the outside air. Dry air with a known humidity is sealed inside the thin-wall pipe 61.

Since the humidity of the air inside the thin-wall pipe 61 is known, the distribution deriving means C1 may calculate the distribution and humidity of the water vapor in the measurement space 11 outside the thin-wall pipe 61 with high accuracy, based on the measurement results inside the thin-wall pipe 61.

In particular, when the exact value of the moisture content of the air sealed in the thin-wall pipe 61 is known, based on the measurement results of the thin-wall pipe 61, the accurate value of the water vapor in the measurement space 11 may be derived, that is, a quantitative analysis is possible from the measurement results in the measurement space 11. Further, even if the exact value of the moisture content of the air sealed in the thin-wall pipe 61 is not known, it is possible to derive a relative moisture content (a ratio of the moisture content) and a relative humidity to the air in the thin-wall pipe 61. In addition, it is possible to remove noise derived from the light source and a photodetector, which is contained in the measurement results in the measurement space 11, based on the measurement results of the thin-wall pipe 61. This noise will be described in detail in Experimental Example 8 below.

Further, the diameter and position of the thin-wall pipe 61 can be arbitrarily changed according to the intensity of the light, the width, the design and the specification of the measurement space 11, etc. Therefore, it is possible to form a thick tubular shape or the like. Furthermore, it is also possible to use an optical fiber, and when the optical fiber is used, an extending direction (a longitudinal direction) may be arranged obliquely or bent with respect to the optical axis. At this time, one end face of the optical fiber is placed near an enlargement lens, and the other end face is placed near the telecentric lens. Moreover, it is not limited to the cylindrical shape, and a polygonal cylindrical shape is also possible. The installation position is not limited to the center of the image, and may be installed in any position within the image.

Furthermore, the thin-wall pipe 61 is not limited to the configuration in which air is sealed therein. For example, if both ends of the thin-wall pipe 61 extend to the outside of the measurement space 11 and the inside of the thin-wall pipe 61 is sufficiently isolated from the air in the measurement space 11, in this state, it is also possible to open both ends of the thin-wall pipe 61.

Experimental Example 7

Figures 15A, 15B, 15C, 15D:
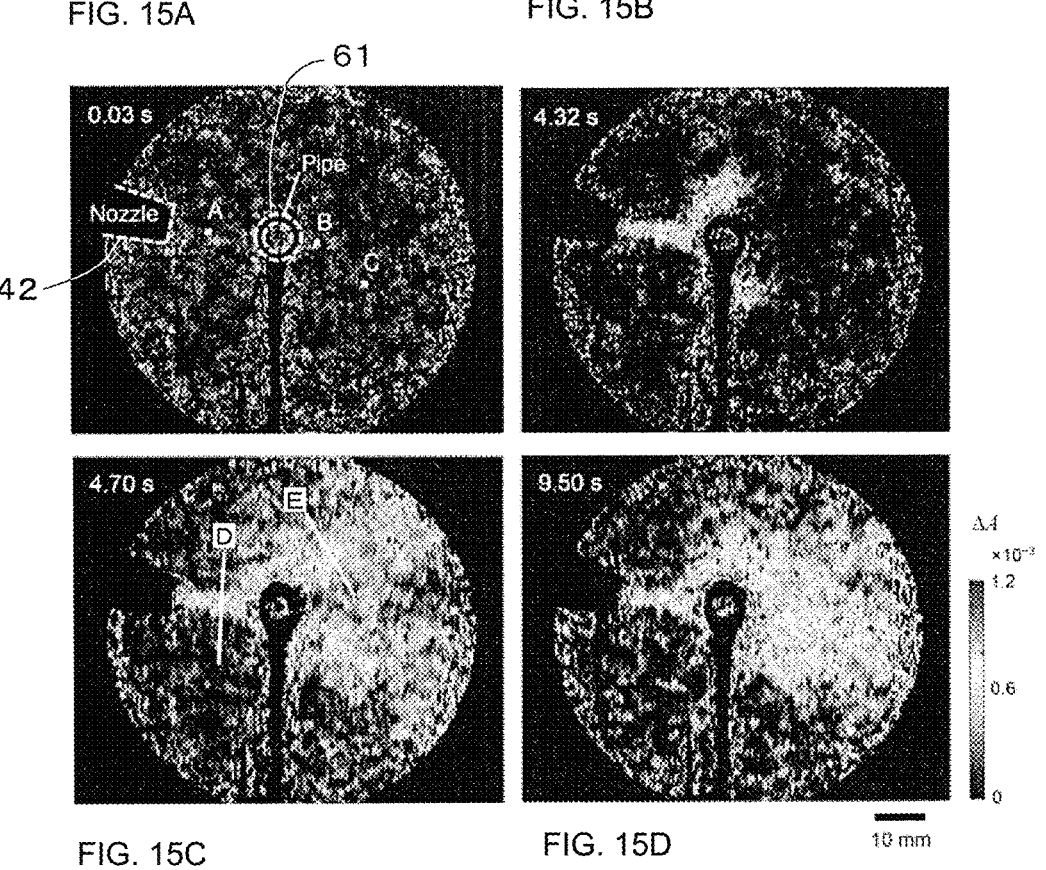

FIGS. 15A to 15D are diagrams describing experimental results of Experimental Example 7, wherein FIG. 15A is an image of ΔA after 0.03 seconds from the start of measurement, FIG. 15B is an image of ΔA after 4.32 seconds from the start of measurement, FIG. 15C is an image of ΔA after 4.70 seconds from the start of measurement, and FIG. 15D is an image of ΔA after 9.50 seconds from the start of measurement.

In Experimental Example 7, the effect of the configuration of the modification of Example 1 was confirmed. As shown in FIGS. 15A to 15D, the lapse of time in the distribution of the moist air discharged from the nozzle 42 was confirmed, and it was also confirmed that the measurement results inside the central thin-wall pipe 61 were stable.

Experimental Example 8

Figures 16A, 16B, 16C:
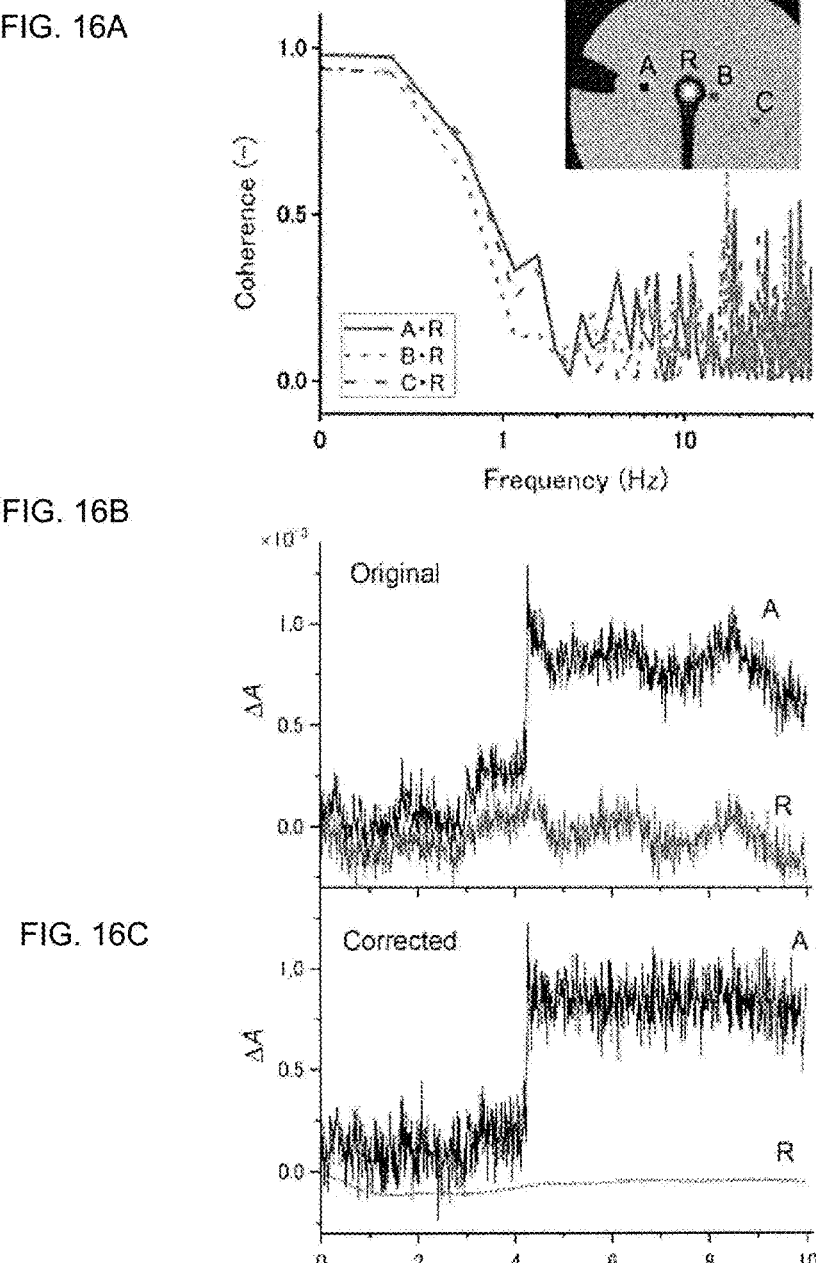

FIGS. 16A to 16C are diagrams describing experimental results of Experimental Example 8, wherein FIG. 16A is a graph illustrating relationships between frequencies and coherences for each ratio of measurement results at each position in the measurement space and the measurement results inside the thin-wall pipe, FIG. 16B is a graph illustrating measurement results of the absorbance difference over time, and FIG. 16C is a graph after performing a correction on fluctuations from the results of FIG. 16B.

In FIG. 16A, for a position A in front of the thin-wall pipe 61, a position B in depth of the thin-wall pipe 61, and a position C in the further depth than the position B with respect to the nozzle 42, the coherence (correlation) of the measurement results (strength) at each position with respect to the measurement result at the position R inside the thin-wall pipe 61 was derived. That is, a vertical axis of FIG. 16A shows the correlation, and the closer to 1, the higher the correlation. The graph in FIGS. 16A to 16C show that the same low-frequency fluctuations (noise) are contained in both the surroundings and inside the pipe. In addition, the fluctuation on the high-frequency side is severe, and clear correlation cannot be seen.

In FIG. 16B, regarding the laser light having a wavelength of 1872 nm, in the graph showing the measurement result at the position A and the measurement result at the position R, even at the measurement result at the position R, where the water vapor concentration should be stable, a low-frequency oscillation in the waveform is observed. This is noise called "fluctuation" caused by the measurement device such as a light source and a camera. From the measurement results of FIG. 16B, by correcting the measurement result at the position A using the measurement result at the position R, a more accurate measurement result from which the noise is removed can be obtained as shown in FIG. 16C.

(Modification)

In the above description, the examples of the present invention have been described in detail, but it is not limited to the above examples, and it is possible to perform various changes within the scope of the purport of the present invention described in claims.

For example, in the above examples, it is preferable to use a laser with high light intensity as the light source, but it is not limited thereto. Depending on the width of the measurement space 11 and the light intensity of the light source, it is possible to use illumination light having lower directivity and convergence than the laser. When illumination light is used, the neutral density filter 23 and the integrating sphere 24a may be omitted.

In the above examples, 1866 nm, 1800 nm and 1872 nm are exemplified as the selected wavelengths, but they are not limited thereto. Other wavelengths may be selected depending on the required intensity and configuration of the laser, etc. In particular, 1800 nm, which is a wavelength with a low absorbance difference, can be changed to any other wavelength if the absorbance difference is low. In addition, if observation with sufficient accuracy is possible only having a wavelength of 1866 nm or wavelength of 1872 nm, a configuration, in which light of a wavelength of 1800 nm for comparison is not used, that is, observation is performed with one type of light, is also possible. In particular, in the situation where there are few other gases that adversely affect the measurement, even 1866 nm alone allows measurement with sufficient accuracy. If 1800 nm is used as a reference, the influence of other components may be eliminated in principle, but actually, there are almost no other gases that have an influence, and the most effective method of the present invention is to discriminate visible condensed water vapor (mist), and remove the influence.

Further, in the above examples, as the measurement space 11, the space open to the atmosphere was exemplified, but it is not limited thereto. A closed space is also possible. In addition, it is also possible to set the degree of airtightness to any space, and the measurement space may be any space such as an inside of a container, a room inside, a facility or the like.

The invention claimed is:

1. A water vapor distribution measurement apparatus comprising:

a light source configured to emit near-infrared light having a wavelength that can be absorbed by water vapor;

a near-infrared light measurement device which is located by sandwiching a two-dimensional measurement space with respect to the light source, and configured to measure a two-dimensionally light absorbance of the near-infrared light, that has passed through the measurement space, at a two-dimensional measurement surface;

an optical system configured to enlarge the near-infrared light emitted from the light source and irradiate the measurement surface; and a distribution deriving means configured to derive a distribution of water vapor in the two-dimensional measurement space based on the two-dimensionally light absorbance of the near-infrared light measured by the near-infrared light measurement device.

2. The water vapor distribution measurement apparatus according to claim 1, comprising the light source configured to emit near-infrared light having a wavelength of 1800 nm to 1900 nm.

3. The water vapor distribution measurement apparatus according to claim 2, comprising the light source configured to alternately emit near-infrared light having a center wavelength of 1866 nm, where the absorbance of water vapor is the maximum in the range of 1800 nm to 1900 nm, and near-infrared light having a center wavelength of 1800 nm, where the absorbance of water vapor is much smaller than at 1866 nm.

4. The water vapor distribution measurement apparatus according to claim 1, comprising: the light source which includes a laser light source configured to emit near-infrared laser light; and the optical system which includes:

an integrating sphere configured to multiply reflect the near-infrared laser light from the light source inside to emit incoherent near-infrared light;

a concave lens configured to refract the near-infrared light from the integrating sphere according to the two-dimensional measurement space; and a convex lens configured to refract the near-infrared light that has passed through the concave lens to irradiate the two-dimensional measurement space with the light.

5. The water vapor distribution measurement apparatus according to claim 1, comprising: an isolation member located within the two-dimensional measurement space and having an internal space isolated from outside air; and the distribution deriving means configured to derive the distribution of the water vapor in the two-dimensional measurement space outside except the isolation member based on a measurement results of the water vapor in the internal space.

6. The water vapor distribution measurement apparatus according to claim 5, wherein a noise in the measurement results of water vapor in the two-dimensional measurement space except the isolation member is removed by using the measurement results of water vapor in the internal space.

\* \* \* \* \*